United States Patent [19]
White et al.

[11] Patent Number: 5,878,122
[45] Date of Patent: Mar. 2, 1999

[54] LONG DISTANCE SERVICE BUREAU

[75] Inventors: Lester Lynn White; Harminder Singh; Peter A. Fortman, all of Raleigh, N.C.

[73] Assignee: Northern Telecom Limited, Quebec, Canada

[21] Appl. No.: 797,244

[22] Filed: Feb. 7, 1997

[51] Int. Cl.⁶ .................................................. H04M 15/00
[52] U.S. Cl. ..................... 379/115; 379/114; 379/121; 379/130; 379/140
[58] Field of Search ................................... 379/111, 112, 379/114, 115, 121, 122, 123, 125, 130, 132, 140, 221, 354, 355, 356

[56] References Cited

U.S. PATENT DOCUMENTS

| | | | |
|---|---|---|---|
| 4,122,308 | 10/1978 | Weinberger et al. | 379/114 |
| 4,538,030 | 8/1985 | Fossett et al. | 379/114 |
| 4,565,903 | 1/1986 | Riley . | |
| 4,751,728 | 6/1988 | Treat | 379/113 |
| 5,157,718 | 10/1992 | Kaplan et al. | 379/218 |
| 5,299,263 | 3/1994 | Beller et al. | 380/30 |
| 5,394,461 | 2/1995 | Garland | 379/106 |
| 5,400,395 | 3/1995 | Berenato | 379/114 |
| 5,416,831 | 5/1995 | Chewning, III et al. | 379/96 |
| 5,420,914 | 5/1995 | Blumhardt | 379/114 |
| 5,424,085 | 6/1995 | Weinberger et al. | 379/114 |
| 5,515,425 | 5/1996 | Penzias et al. | 379/114 |
| 5,519,769 | 5/1996 | Weinberger et al. | 379/114 |
| 5,550,910 | 8/1996 | DeJager | 379/220 |
| 5,570,417 | 10/1996 | Byers | 379/115 |
| 5,606,602 | 2/1997 | Johnson et al. | 379/114 |
| 5,638,433 | 6/1997 | Bubbien, Jr. et al. | 379/114 |
| 5,661,792 | 8/1997 | Akinpelu et al. | 379/221 |
| 5,668,955 | 9/1997 | DeCiutiis et al. | 379/130 |
| 5,740,239 | 4/1998 | Bhagat et al. | 379/243 |

*Primary Examiner*—Curtis A. Kuntz
*Assistant Examiner*—Binh K. Tieu
*Attorney, Agent, or Firm*—Finnegan, Henderson, Farabow, Garrett & Dunner, L.L.P.

[57] ABSTRACT

A long distance service bureau assists subscribers in selecting a long distance carrier for a long distance, or tariff, call. The long distance service bureau includes a rate table memory and a service logic element. The rate table memory stores rate data, representing tolls charged by various long distance carriers, and subscriber preference data, representing a subscriber's preferences for certain ones of the various long distance carriers. The service logic element controls the rate table memory. The service logic element periodically communicates with the various long distance carriers to retrieve rate data changes, stores the rate data changes in the rate table memory, and downloads only the rate data changes to local equipment of the subscriber during idle periods of the subscriber's local equipment.

54 Claims, 8 Drawing Sheets

LONG DISTANCE SERVICE BUREAU

BACKGROUND OF THE INVENTION

Systems and methods consistent with the present invention are directed to a long distance service bureau that periodically polls long distance carriers for current rate information and stores user carrier preference information to automatically determine, or to allow a user to determine, a long distance carrier to use for a particular long distance, or tariff, call.

Traditionally, users selected long distance carriers for their long distance, or tariff, calls one of two ways. First, a user could designate a default long distance carrier through which all of the user's telephone calls were automatically routed. This type of selection was inherently insufficient because it did not take into consideration the different rates offered by other long distance carriers when the user placed the telephone call.

Second, a user could manually select a long distance carrier through which to route the user's telephone call. Such manual selection of a long distance carrier allowed the user to choose, for example, the long distance carrier offering the least expensive toll at the time the user placed the telephone call. Although permitting greater freedom of choice, manual long distance carrier selection presents several problems for the user. For example, to choose a long distance carrier other than the designated default long distance carrier, the user must manually select every telephone call. Moreover, to maximize the effectiveness of manual long distance carrier selection, the user must either be knowledgeable regarding various long distance parameters, or have ready access to such information. To select the long distance carrier offering the least expensive rate, for example, the user must know all of the available long distance carriers, as well as their various rates. To complicate matters, long distance rates for a particular long distance carrier vary not only from day to day, but from hour to hour as well.

Several recent systems address these traditional problems. For example, U.S. Pat. No. 5,420,914 issued to Blumhardt discloses a system for real-time selection of a long distance carrier. The system employs an advanced intelligent network having a service control point that retrieves carrier rate information, such as tolls charged for particular calling days and calling times, for various long distance carriers from a network database. When a user places a telephone call, the service control point determines the long distance carrier having the least expensive toll for the day and time of the telephone call, and automatically routes the call using that long distance carrier.

The system of the Blumhardt patent has two inherent problems: it lacks flexibility and does not provide reliable carrier rate information. Flexibility is a problem because selecting the lowest-cost carrier may not always be the carrier the user wants for a particular call, since, for example, not all long distance carriers offer the same quality connection. Reliability is a problem because Blumhardt provides no mechanism for updating the carrier rate database so the carrier rate information becomes outdated due to the variable nature of the rates of the various long distance carriers.

A system that addresses one of these problems is U.S. Pat. No. 4,751,728 issued to Treat. This patent discloses a telephone call monitoring, metering, and selection device that displays the rates offered by various long distance carriers to a user so that the user can select the carrier of his choice. The device requires the user to manually enter the identity of the various carriers and their access numbers and rates so that the device can display such information to the user when the user desires to place a telephone call. Because this system depends upon manual input of the rate information, however, the user must continuously update the rate information to current information.

Another system that addresses this problem is U.S. Pat. No. 5,400,395 issued to Berenato. This patent discloses a telephone line selector that polls the various long distance carriers for current rate information each time a user places a telephone call. When the user dials a long distance telephone number, the telephone line selector temporarily suspends the user's call while it calls each long distance carrier to obtain current rate information. Once the telephone line selector determines the lowest cost long distance carrier, it routes the user's telephone call on the lowest cost carrier, using the dialed telephone number. Because this system updates all of the rate information for the long distance carriers each time the user places a long distance call, however, the system tends to be undesirably slow.

In light of the above systems, a need exists to rapidly provide users with current rate information while also permitting automatic carrier selection for particular calls.

SUMMARY OF THE INVENTION

Systems and methods consistent with the present invention address this need by providing a long distance service bureau that rapidly provides users with current rate information offered by various long distance carriers, permits users to choose their long distance carrier on a per call basis, and automatically selects long distance carriers for particular tariff calls according to user preferences.

In accordance with the purpose of the invention as embodied and broadly described herein, the long distance service bureau consistent with the principles of the present invention includes a rate table memory and a service logic element. The rate table memory stores rate data, representing tolls charged by various long distance carriers, and subscriber preference data, representing a subscriber's preferences for certain ones of the various long distance carriers. The service logic element controls the rate table memory. The service logic element periodically communicates with the various long distance carriers to retrieve rate data changes, stores the rate data changes in the rate table memory, and downloads only the rate data changes to local equipment of the subscriber during idle periods of the subscriber's local equipment.

BRIEF DESCRIPTION OF THE DRAWINGS

The accompanying drawings, which are incorporated in and constitute a part of this specification, illustrate systems and methods consistent with this invention and, together with the description, explain the objects, advantages and principles of the invention. In the drawings.

DETAILED DESCRIPTION OF THE PREFERRED EMBODIMENTS

The following detailed description of the invention refers to the accompanying drawings that illustrate preferred embodiments consistent with the principles of this invention. Other embodiments are possible and changes may be made to the embodiments without departing from the spirit and scope of the invention. The following detailed description does not limit the invention. Instead, the scope of the invention is defined only by the appended claims.

The long distance service bureau consistent with the principles of the present invention rapidly provides a subscriber of the long distance service bureau with rate information offered by various long distance carriers, taking into account the subscriber's preferences, and permitting manual or automatic selection of a carrier at the discretion of the subscriber based on the rate information and the subscriber's preferences.

I. Connection via Local Switch

A. Network Elements

Figure 1:
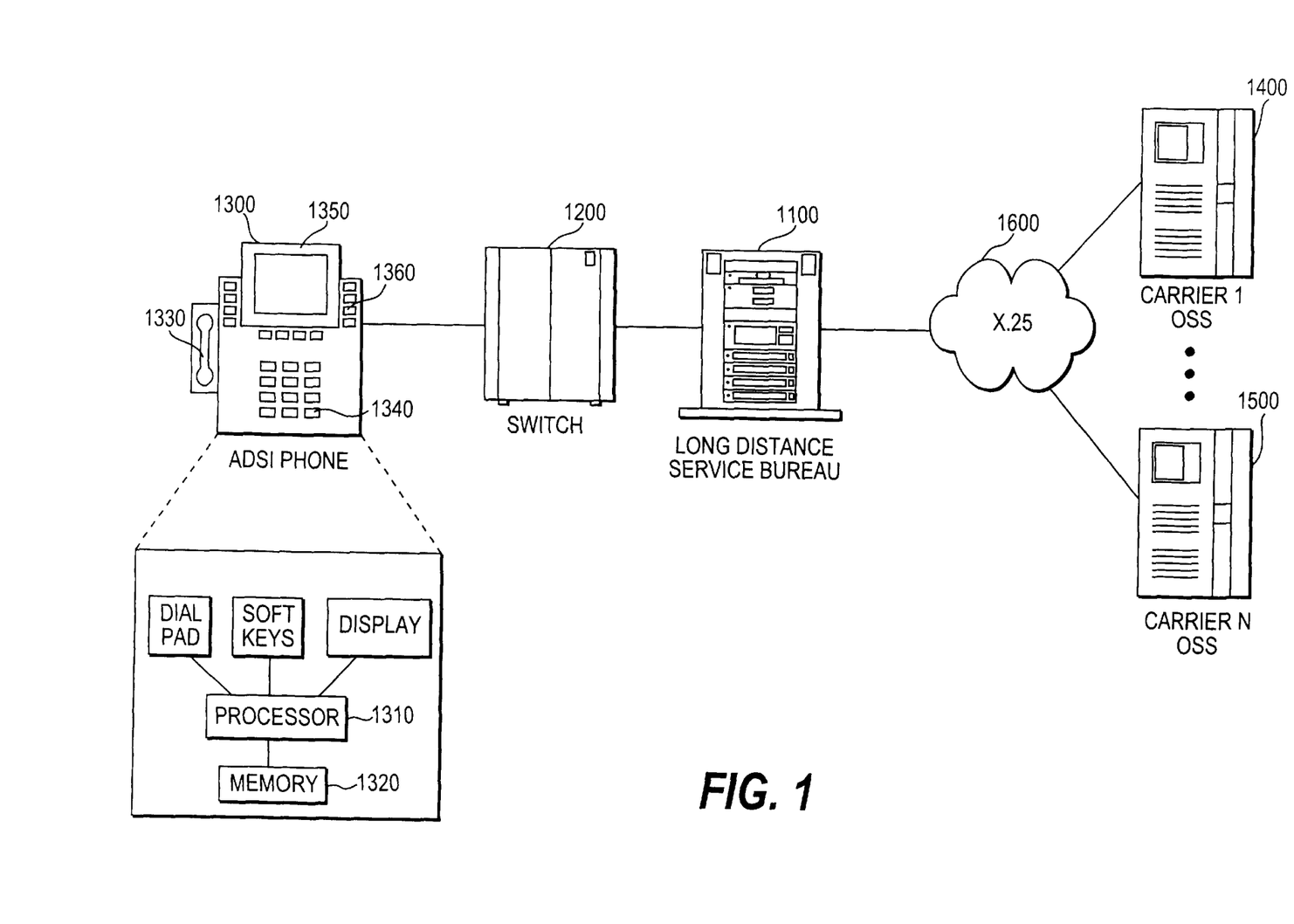
FIG. 1 is a diagram of a communications network containing the long distance service bureau consistent with the present invention.

FIG. 1 is a diagram of a communications network containing the long distance service bureau of the present invention. Subscribers communicate with long distance service bureau (LDSB) 1100 via a local end office/PBX switch, such as switch 1200.

For simplicity purposes only, FIG. 1 shows a single subscriber who has an Analog Display Services Interface (ADSI)-compatible telephone 1300. ADSI-compatible telephone 1300 has internal processor 1310 and memory 1320, handset 1330, dial pad 1340, visual display 1350, and soft keys 1360. A conventional ADSI-compatible telephone is described in U.S. Pat. No. 5,416,831 issued to Chewning, III et al.

ADSI-compatible telephone 1300 connects to switch 1200 using a conventional ADSI connection, typically a bidirectional protocol based upon dual-tone multiple-frequency (DTMF) and BELL 202 modem signaling. Switch 1200 connects to LDSB 1100 using a T1_UTT connection. LDSB 1100 connects to various long distance carriers' Operation Support Systems (OSS), such as carrier 1 OSS 1400 through carrier n OSS 1500, via a telecommunications network, such as X.25 network 1600, to poll the long distance carriers regarding their long distance rates.

Figure 2:
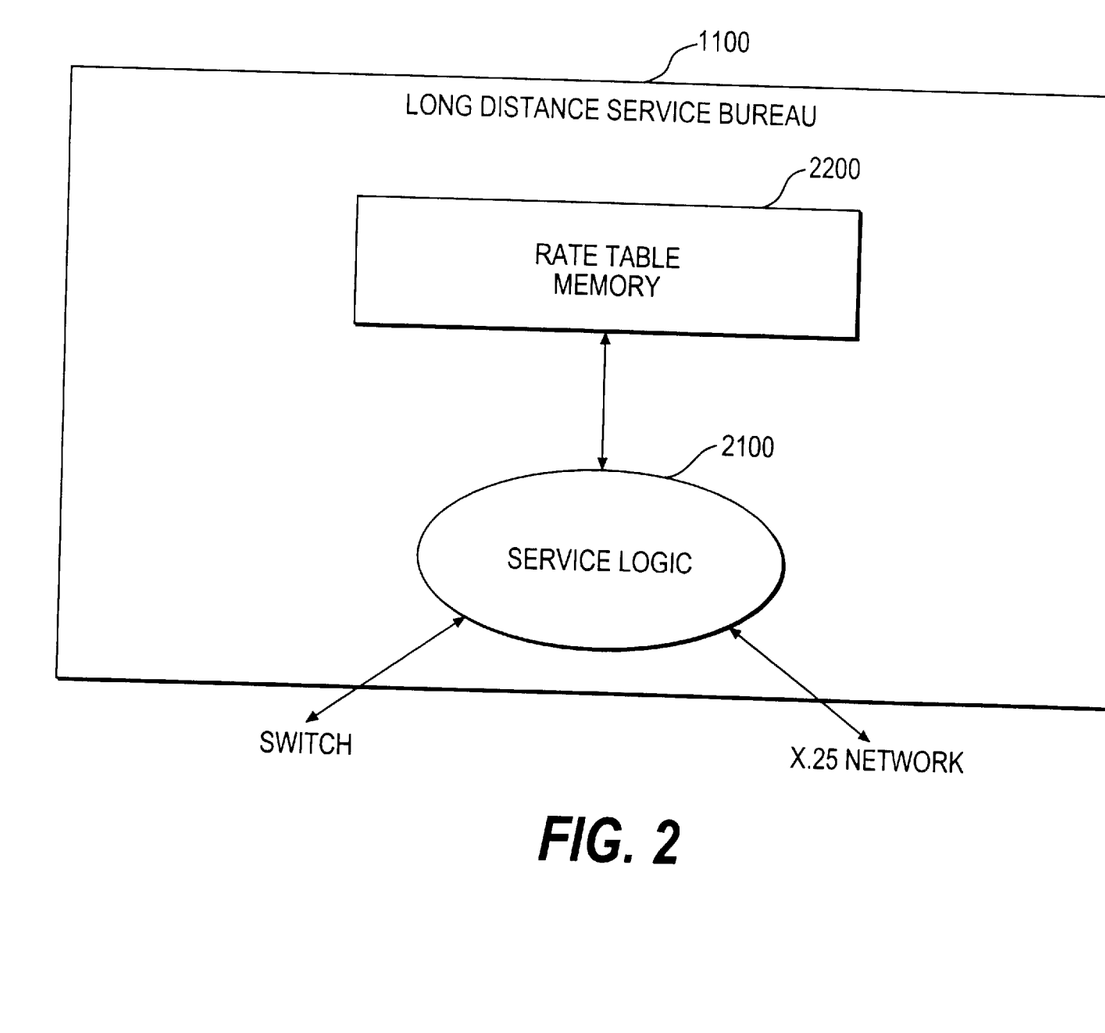
FIG. 2 is a diagram of the components of the long distance service bureau in the embodiment of the communications network depicted in FIG. 1.

FIG. 2 shows the elements in LDSB 1100, including service logic 2100 and rate table memory 2200. Service logic 2100 includes a conventional processor executing software to facilitate communication with ADSI-compatible telephone 1300 and carrier OSSs 1400 through 1500.

Rate table memory 2200 includes a large capacity memory device, such as a disk array, for storing rate information, subscriber preference data, and special plan data for all subscribers of the long distance service bureau.

The rate information includes tolls charged by the various long distance carriers to call a particular location at a certain day and time. The subscriber preference data includes the subscriber's preferences for a particular long distance carrier for certain situations or for certain dialed telephone numbers. For example, the subscriber preference data might include the subscriber's desire to always use a certain long distance carrier for a particular long distance telephone number or other information, such as, for example, "always use XYZ carrier unless greater than 3 cents a minute savings" or "never use ABC carrier." The special plan data might include special rates or savings plans offered by the long distance carriers.

Service logic 2100 communicates with carrier OSSs 1400 through 1500 to update the rate information and the special plan data stored in rate table memory 2200. Service logic 2100 communicates with ADSI-compatible telephone 1300 while ADSI telephone handset 1330 is on-hook to store a mini-rate table in ADSI telephone memory 1320. ADSI telephone memory 1320 stores only a subset of the information in rate table memory 2200 due to the memory's limited capacity.

Preferably, the mini-rate table includes rate information for only routinely called zones and possibly a "wild-card" zone for infrequently called numbers. A zone is an area serviced by one or more long distance carriers, for example, the east and west coasts of the United States, Ottawa, and the United Kingdom would constitute zones. ADSI telephone processor 1310 determines which zones constitute the routinely called zones based on the subscriber's calling pattern. Alternatively, the subscriber can designate the routinely called zones via soft key or dial pad input.

B. Processing

Figure 3:
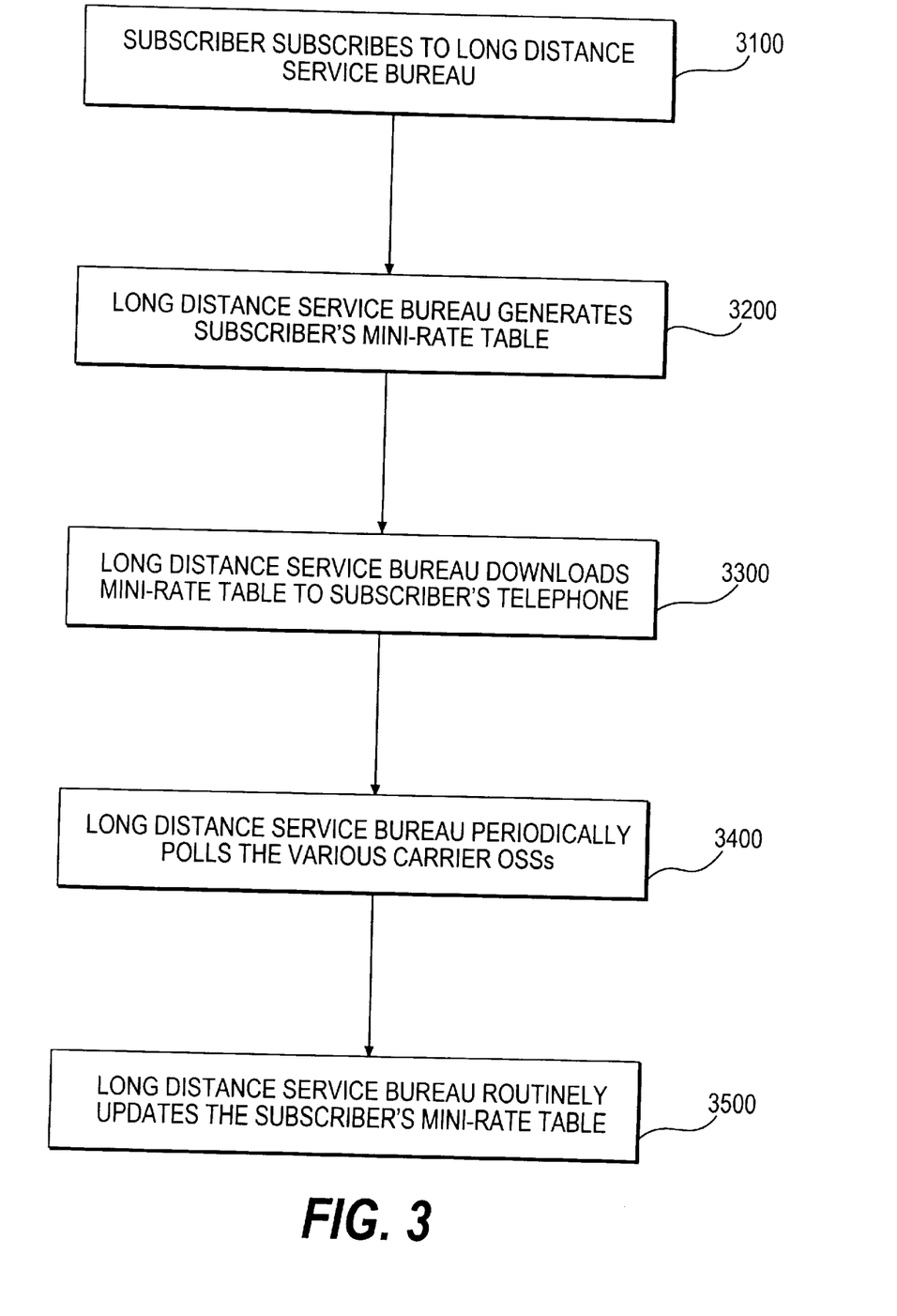
FIG. 3 is a flowchart of an operation consistent with the present invention for maintaining a current mini-rate table in an ADSI-compatible telephone.

FIG. 3 is a flowchart of an operation consistent with this invention for maintaining a current mini-rate table in ADSI-compatible telephone 1300. The subscriber subscribes to the service offered by LDSB 1100 (FIG. 1) [step 3100]. In this initial subscription step, LDSB 1100 records the subscriber's name, telephone number, and information regarding any long distance savings plans to which the subscriber belongs in rate table memory 2200. Also at this time, the subscriber informs LDSB 1100 of the subscriber's long distance carrier preferences.

Based on the information received from the subscriber and information retrieved from carrier 1 OSS 1400 through carrier n OSS 1500, LDSB 1100 generates a mini-rate table for the subscriber [step 3200]. The mini-rate table contains rate information for the subscriber's routinely called zones, the subscriber's subscriber preference data, and any special plan data offered by the long distance carriers. The mini-rate table is configured as a look-up table using such criteria as the called zone, the day of the week, and the time of the day.

Once LDSB 1100 generates the mini-rate table, LDSB 1100 downloads it to ADSI-compatible telephone 1300. LDSB 1100 downloads the mini-rate table when ADSI telephone handset 1330 is on-hook, so ADSI-compatible telephone 1300 is not being used by the subscriber [step 3300]. LDSB 1100 uses a conventional Utility Test Trunk (UTT) for this automatic download.

LDSB 1100 periodically polls carrier I OSS through carrier n OSS to update rate table memory 2200 [step 3400]. After every polling, LDSB 1100 determines which mini-rate tables are affected by the update, and updates the mini-rate tables associated with the affected subscribers [step 3500]. As with the initial download of the mini-rate table, LDSB 1100 updates the subscriber's mini-rate table during idle periods of ADSI-compatible telephone 1300 using a conventional UTT.

Figure 4:
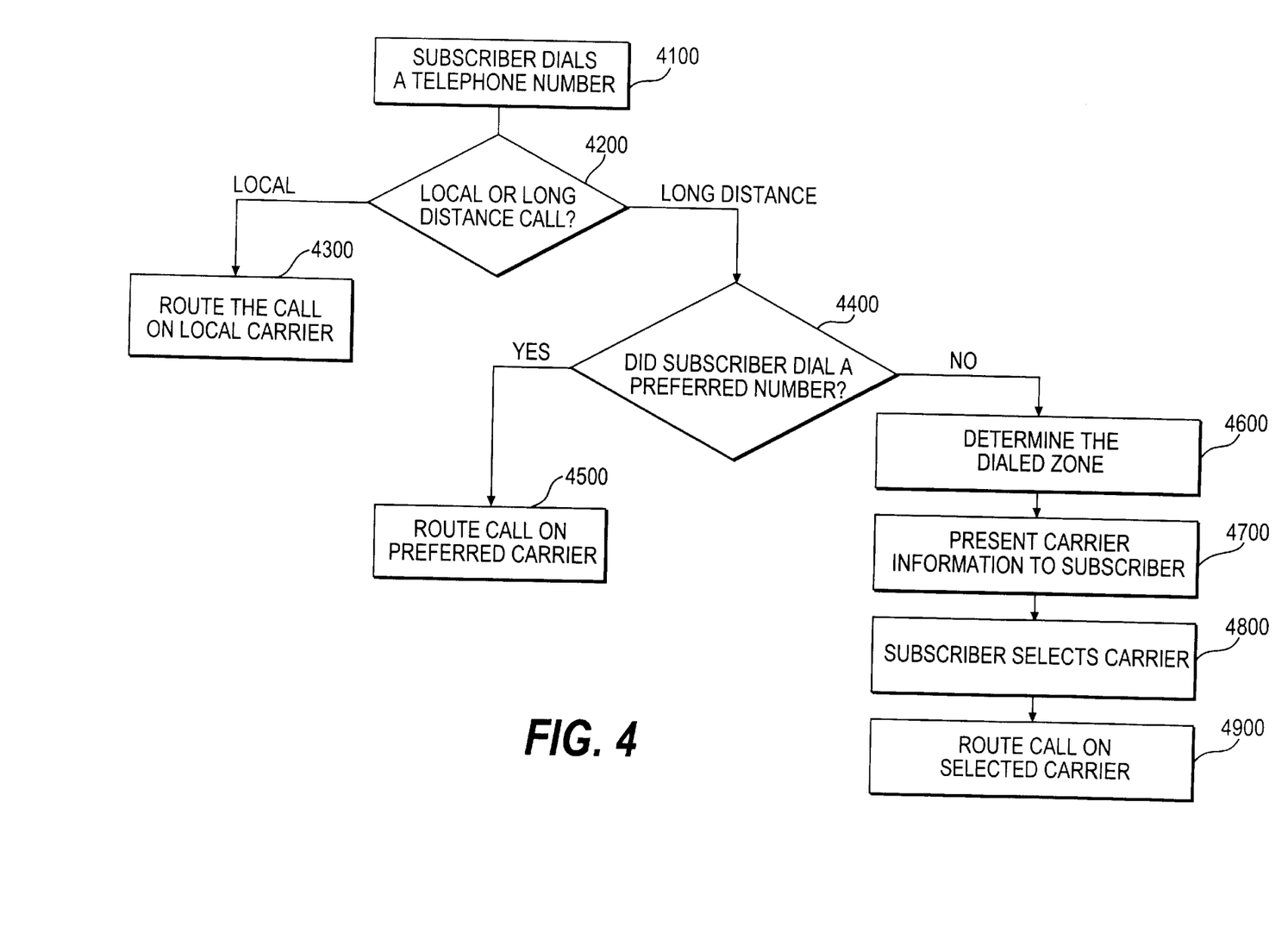
FIG. 4 is a flowchart of a process consistent with the present invention by which the subscriber places a telephone call.

FIG. 4 is a flowchart of a process consistent with this invention by which the subscriber places a telephone call. After the subscriber lifts ADSI telephone handset 1330 and dials a telephone number using dial pad 1340 [step 4100], ADSI telephone processor 1310 detects the dialed digits and determines whether the subscriber dialed a local or a long distance telephone number [step 4200]. Processor 1310 might make this determination by detecting the number of dialed digits or by detecting whether the first digit dialed is a "1".

If processor 1310 determines that the subscriber dialed a local telephone number, then it routes the call on the local carrier [step 4300]. If the subscriber dialed a long distance telephone number, processor 1310 determines whether the telephone number dialed is a preferred telephone number, that is, a telephone number for which the subscriber has preselected a preferred carrier [step 4400]. Processor 1310 makes this determination by comparing the dialed telephone number to the subscriber preference data stored in the mini-rate table in memory 1320.

If the subscriber dialed a preferred telephone number, processor 1310 determines the identity of the preselected preferred carrier from the mini-rate table and routes the call on the preferred carrier by prefixing the dialed digits with the preferred long distance carrier's Carrier Code [step 4500]. If the subscriber did not dial a preferred telephone number, processor 1310 determines the zone for which the telephone call is to be routed based on the dialed digits [step 4600]. For example, if the subscriber dialed 1-202-123-1234, processor 1310 would determine based on the first dialed "1" that the subscriber dialed a long distance number, and based on the next three numbers that the subscriber dialed a telephone number in the east coast zone.

Once processor 1310 determines the called zone, processor 1310 determines which long distance carriers service the called zone. Processor 1310 then determines whether the mini-rate table stores subscriber preference data or any special plan data associated with these long distance carriers to compile a list of long distance carriers that can service the long distance telephone call.

Processor 1310 presents the long distance carrier list to the subscriber to aid the subscriber in selecting a long distance carrier [step 4700]. Preferably, processor 1310 displays on ADSI telephone visual display 1350 the available long distance carriers and their rates corresponding to the day and time of the subscriber's telephone call [step 4700]. Based on the information displayed, the subscriber selects a long distance carrier for the telephone call using ADSI telephone soft keys 1360 [step 4800]. Processor 1310 then routes the call on the selected carrier by prefixing the dialed digits with the selected long distance carrier's Carrier Code [step 4900].

Alternatively, processor 1310 might present the available long distance carriers and their rates to the subscriber via voice messaging over ADSI telephone handset 1330. The subscriber could then select the long distance carrier for the telephone call using ADSI telephone dial pad 1340 or by simply speaking into handset 1330. Processor 1310 would detect the subscriber's selection using a conventional tone detection or voice detection system.

II. Connection via Communications Network

A. Network Elements

Figure 5:
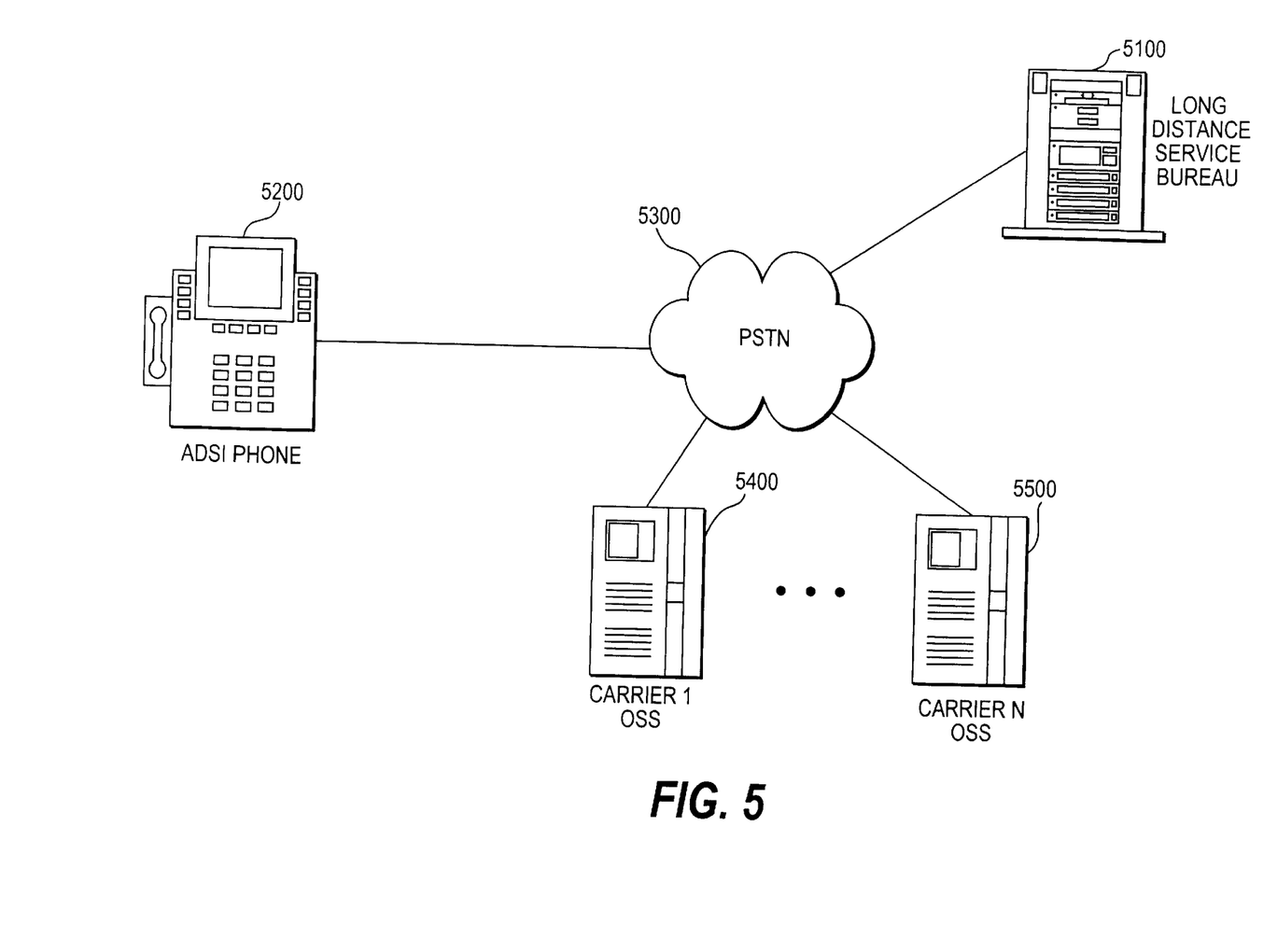
FIG. 5 is a diagram of a communications network containing the long distance service bureau consistent with the present invention.

FIG. 5 shows a communications network containing a long distance service bureau in an alternative embodiment consistent with the principles of the present invention. The subscriber again connects to long distance service bureau (LDSB) 5100 using ADSI-compatible telephone 5200. However, unlike the network of the embodiment shown in FIG. 1, ADSI-compatible telephone 5200 connects to LDSB 5100 via a telecommunications network, such as Public Switched Telephone Network (PSTN) 5300, by conventional means, such as described above. LDSB 5100 connects to carrier 1 OSS 5400 through carrier n OSS 5500 over PSTN 5300 to poll these long distance carriers for updated rate information.

Figure 6:
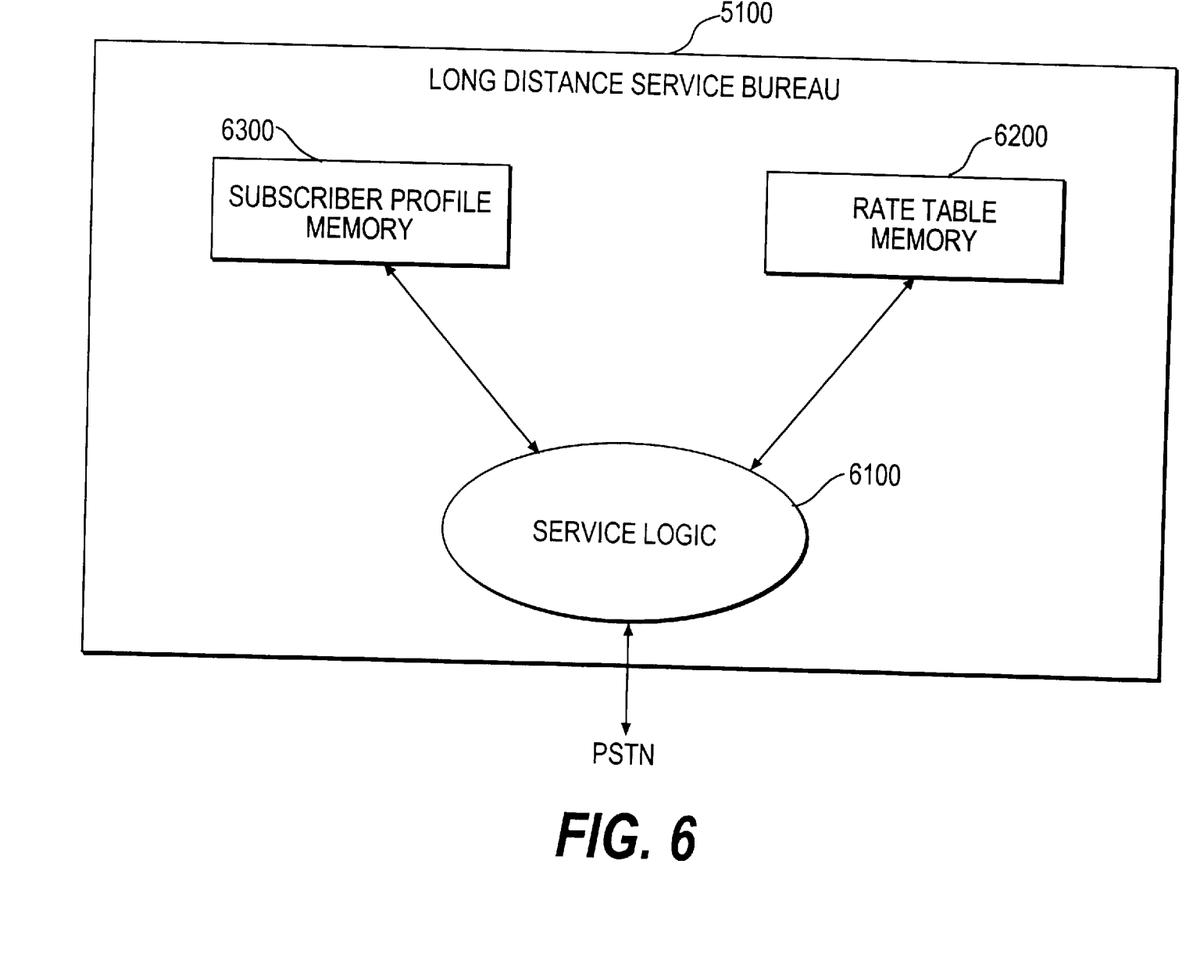
FIG. 6 is a diagram of the components of the long distance service bureau in the alternative embodiment of the communications network depicted in FIG. 5.

FIG. 6 shows the components of LDSB 5100, including service logic 6100, rate table memory 6200, and subscriber profile memory 6300. Service logic 6100 includes a conventional processor executing software to process telephone calls from the subscribers and to facilitate communication with ADSI-compatible telephone 5200 and carrier OSSs 5400 through 5500. Service logic 6100 might communicate with a subscriber using an interactive voice response unit or detecting in-band DTMF tones.

Rate table memory 6200 preferably includes a large capacity memory device, such as a disk array, for storing rate information and special plan data. The rate information includes tolls charged by the various long distance carriers to call a particular zone at a certain day and time. The special plan data might include special rates or savings plans offered by the long distance carriers.

Subscriber profile memory 6300 includes a large capacity memory device that records subscriber preference data for all subscribers of the long distance service bureau. The subscriber preference data includes the subscriber's preferences for a particular long distance carrier for certain situations or for certain dialed telephone numbers, as described above.

Service logic 6100 communicates with carrier OSSs 5400 through 5500 to update the rate information and special plan data stored in rate table memory 6200.

B. Processing

Figure 7:
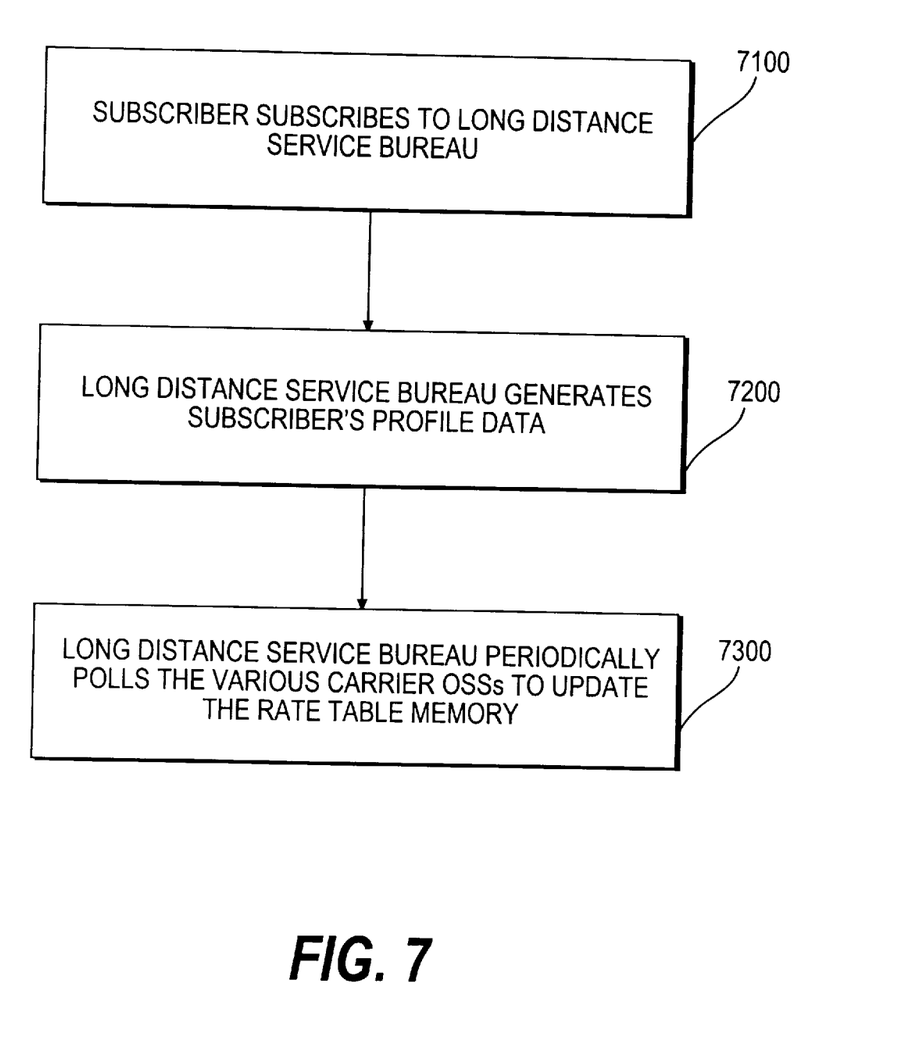
FIG. 7 is a flowchart of an operation consistent with the present invention for setting up and maintaining the subscriber profile memory and the rate table memory shown in FIG. 6.

FIG. 7 is a flowchart of an operation consistent with this invention for setting up and maintaining subscriber profile memory 6300 and rate table memory 6200. Again, the subscriber subscribes to the long distance service bureau by conventional means [step 7100]. During this initial subscription step, the subscriber informs LDSB 5100 of any carrier preferences from which LDSB 5100 formulates the subscriber's profile data for storage in subscriber profile memory 6300 [step 7200].

Once LDSB 5100 generates the subscriber's profile data, LDSB 5100 is ready to service the subscriber. To assure that rate table memory 6200 has current carrier rate information, LDSB 5100 periodically polls carrier 1 OSS 5400 through carrier n OSS 5500 to update the rate information in rate table memory 6200.

Figure 8:
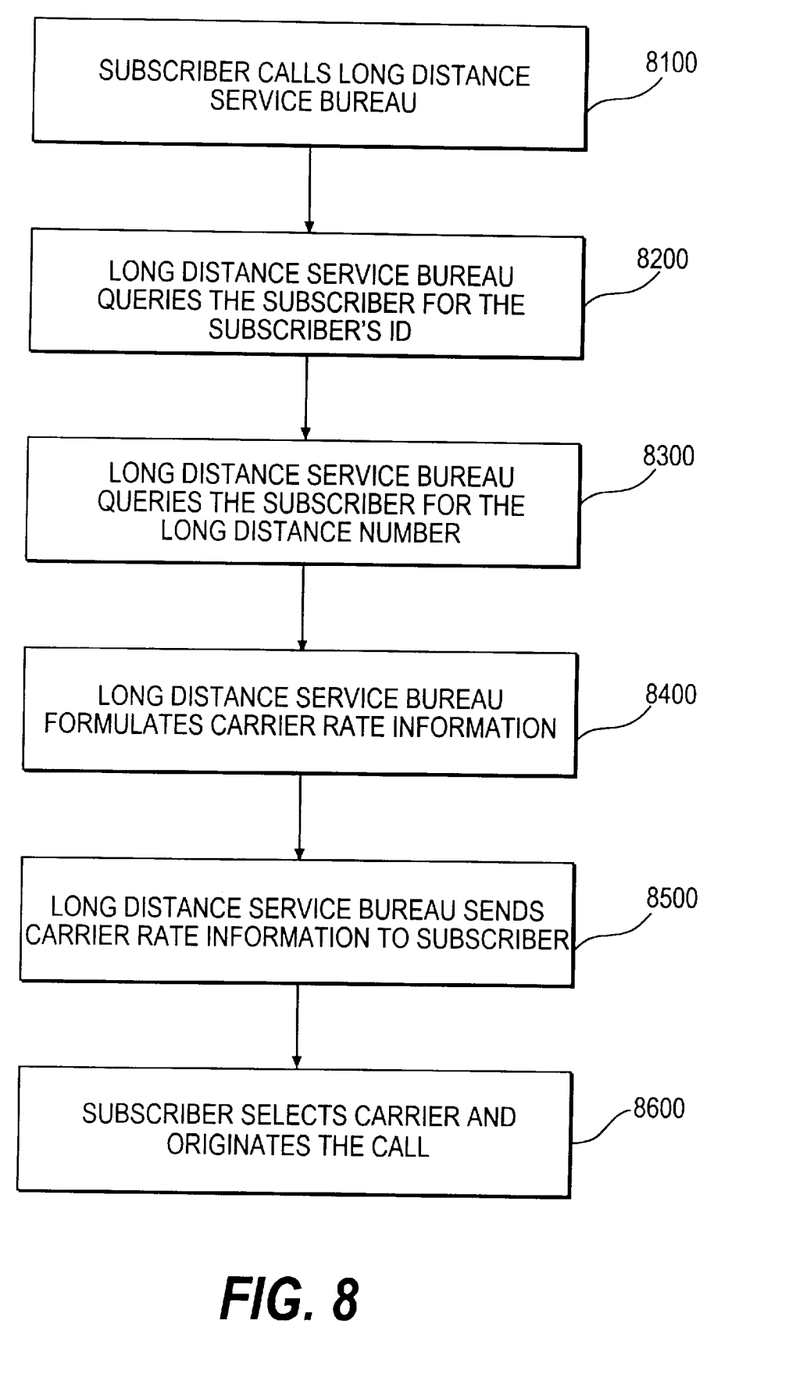
FIG. 8 is a flowchart of a process consistent with the present invention by which the subscriber places a telephone call.

FIG. 8 is a flowchart of a process consistent with this invention by which the subscriber places a telephone call. The subscriber preferably accesses LDSB 5100 by dialing its special toll-free 800 number [step 8100]. Alternatively, the subscriber could set up ADSI-compatible telephone 5200 to automatically connect to LDSB 5100, which is done for voice activated dialing.

LDSB 5100 queries the subscriber for the subscriber's caller ID so that LDSB 5100 can retrieve the subscriber's profile and service preferences from subscriber profile memory 6300 [step 8200]. Alternatively, LDSB 5100 might detect the subscriber's caller ID from the subscriber's calling number.

Once LDSB 5100 retrieves the subscriber's profile and service preferences, LDSB 5100 queries the subscriber for the long distance telephone number the subscriber wishes to call [step 8300]. Upon receiving the dialed digits via in-band DTMF tones, LDSB 5100 formulates carrier rate information based on the subscriber's profile and service preferences from subscriber profile memory 6300 and the rate information and special plan data from rate table memory 6200 [step 8400]. Alternatively, LDSB 5100 might query carrier 1 OSS 5400 through carrier n OSS 5500 for updated rate information or special rates to use in formulating the carrier rate information.

LDSB 5100 downloads the carrier rate information to ADSI-compatible telephone 5200 [step 8500]. The carrier rate information is sufficient to permit the subscriber to choose and place the long distance telephone call using any of the carriers for which rate information was provided, or using a default carrier. LDSB 5100 may disconnect at this point or may stay connected until the subscriber makes a selection to provide help or other information.

Based on the carrier rate information, the subscriber selects a carrier to launch the long distance telephone call [step 8600]. Once the subscriber selects the carrier, ADSI-compatible telephone 5200 automatically releases, that is, goes on-hook for greater than 1.55 seconds, then originates a call prefixing the selected carrier's Carrier Code to the dialed digits. Alternatively, the subscriber could set up the subscriber's profile in subscriber profile memory 6300 to automatically select a carrier and cause ADSI-compatible telephone 5200 to automatically launch the call.

III. Conclusion

The long distance service bureau according to the principles of the present invention provides the subscriber with great flexibility in selecting a long distance carrier from presenting the subscriber with a list of possible carriers and their corresponding rates to automatically selecting a carrier based on the subscriber's preferences.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the subscriber has been described as connecting to the network using an ADSI-compatible telephone. This need not, however, be the case. The subscriber could, for example, use a personal computer or a specialized telephone to connect to the network, receive the carrier rate information, and launch the call. The scope of the invention is defined by the claims and their equivalents.

What is claimed is:

1. A method for placing a tariff call, comprising the steps, executed by a processor, of:

receiving carrier preference data indicating preferred long distance carriers for chosen telephone numbers, receiving a dialed telephone number;

determining whether the dialed telephone number is one of the chosen telephone numbers;

routing the call on one of the preferred long distance carriers when the dialed telephone number is one of the chosen telephone numbers; and routing the call on a selected long distance carrier when the dialed telephone number is not one of the chosen telephone numbers, the step of routing the call on the selected long distance carrier including the substeps of presenting rate information offered by long distance carriers, and receiving a long distance carrier selection.

2. The method of claim 1, further comprising the steps of determining whether the dialed telephone number represents a tariff call; and routing the call on a local carrier when the dial telephone number is not a tariff call.

3. The method of claim 1, further comprising the step of determining that the dialed telephone number represents a tariff call; and determining a zone for which the tariff call is directed.

4. The method of claim 3, wherein the presenting substep comprises the substep of presenting rate information for only long distance carriers servicing the determined zone.

5. (Amended) The method of claim 1, wherein the routing the call on one of the preferred long distance carriers step comprises the substep of prefixing the dialed telephone number with a Carrier Code corresponding to the preferred long distance carrier.

6. The method of claim 1, wherein the routing the call on the selected long distance carrier step comprises the substep of prefixing the dialed telephone number with a Carrier Code corresponding to the selected long distance carrier.

7. The method of claim 1, wherein the presenting substep includes the substep of displaying rate information offered by the long distance carriers.

8. The method of claim 1, further comprising the step of updating the rate information presented in the presenting substep to current rate information offered by the long distance carriers during idle periods of the processor.

9. An apparatus for placing a tariff telephone call, comprising:

memory means for storing long distance carrier data and corresponding rate data;

updating means for receiving updated rate data during idle periods of the apparatus and for storing the updated rate data in the memory means;

means for detecting when a user dials a tariff telephone number corresponding to a tariff telephone call;

means for presenting a subset of the carrier data and corresponding rate data to the user based on preferred long distance carriers previously selected by the user when the dialed tariff telephone number is detected;

means for receiving a selection of a long distance carrier from the presented carrier data subset; and means for routing the tariff telephone call on the selected long distance carrier.

10. The apparatus of claim 9, further comprising means for determining whether the dialed tariff telephone number is a predetermined telephone number; and means for routing the tariff telephone call on a predetermined long distance carrier when the dialed tariff telephone number is the predetermined telephone number.

11. The apparatus of claim 10, wherein the means for routing the tariff telephone call on the predetermined long distance carrier comprises means for prefixing the dialed tariff telephone number with a Carrier Code corresponding to the predetermined long distance carrier.

12. The apparatus of claim 9, further comprising means for determining whether the dialed tariff telephone number is one of a plurality of predetermined telephone numbers; and means for routing the tariff telephone call on a predetermined long distance carrier when the dialed tariff telephone number is one of the plurality of predetermined telephone numbers.

13. The apparatus of claim 9, further comprising means for determining that a call is a local telephone call when the detecting means detects that the user has not dialed a tariff telephone number; and means for routing the local telephone call on a local carrier.

14. The apparatus of claim 9, wherein the detecting means includes means for determining a zone for which the tariff telephone call is directed.

15. The apparatus of claim 14, wherein the output means includes means for presenting carrier data and corresponding rate data for only long distance carriers servicing the determined zone.

16. The apparatus of claim 9, wherein the routing means includes means for prefixing the dialed tariff telephone number with a Carrier Code corresponding to the selected long distance carrier.

17. The apparatus of claim 9, wherein the presenting means comprises a display for displaying the subset of the carrier data and corresponding rate data.

18. A telephone device for placing a tariff telephone call, comprising:

a handset;

a dial pad having a plurality of numbered keys;

a memory for storing long distance carrier data and corresponding rate data;

an output element for presenting a subset of the carrier data and corresponding rate data; and a processor for controlling the memory and the output element, the processor comprising:

a receiving element configured to receive a telephone number entered via the dial pad, a determination element configured to determine whether the dialed telephone number is a predetermined telephone number, a subset generation element configured to generate the subset of the carrier data and corresponding rate data based on previously chosen long distance carriers, a presentation element configured to cause the output element to present the subset of the carrier data and corresponding rate data, a receiving element configured to receive a long distance carrier selection, and a routing element configured to route the tariff telephone call on a predetermined long distance carrier when the dialed telephone number is the predetermined telephone number, and to route the tariff telephone call on a selected long distance carrier when the dialed telephone number is not the predetermined telephone number.

19. The telephone device of claim 18, further comprising a set of soft keys; and wherein the receiving element configured to receive the long distance carrier selection comprises means for receiving the long distance carrier selection via the set of soft keys.

20. The telephone device of claim 18, wherein the output element is a visual display configured to display the subset of the carrier data and corresponding rate data.

21. The telephone device of claim 18, wherein the processor further comprises a detection element configured to detect whether the dialed telephone number represents a tariff telephone call or a local telephone call; and wherein the routing element includes means for routing the detected local telephone call on a local carrier.

22. The telephone device of claim 18, wherein the processor further comprises a detection element configured to detect that the dialed telephone number represents a tariff telephone call, and a zone determination element configured to determine a zone for which the tariff telephone call is directed.

23. The telephone device of claim 22, wherein the presentation element includes means for causing the output element to present the carrier data and corresponding rate data for only long distance carriers servicing the determined zone.

24. The telephone device of claim 18, wherein the routing element includes means for prefixing the dialed telephone number with a Carrier Code corresponding to the predetermined long distance carrier when the dialed telephone number is the predetermined telephone number.

25. The telephone device of claim 18, wherein the routing element includes means for prefixing the dialed telephone number with a Carrier Code corresponding to the selected long distance carrier when the dialed telephone number is not the predetermined telephone number.

26. The telephone device of claim 18, wherein the processor further comprises an updating element configured to update the rate data presented by the output element to current rate data for the long distance carrier data during periods when the handset is on-hook.

27. A long distance service bureau comprising:

a rate table memory for storing rate data representing tolls charged by various long distance carriers and subscriber preference data representing a user's preferences for certain ones of the various long distance carriers; and a service logic element for controlling the rate table memory, the service logic element including means for periodically communicating with the various long distance carriers to retrieve rate data changes, means for storing the rate data changes in the rate table memory, and means for downloading only the rate data changes, applicable to the user based on the subscriber preference data, to local equipment of the user.

28. The long distance service bureau of claim 27, wherein the rate table memory further stores special plan data representing special rates offered by the various long distance carriers;

wherein the periodically communicating means includes means for periodically communicating with the various long distance carriers to retrieve new special rates; and wherein the storing means includes means for storing the new special rates in the rate table memory.

29. The long distance service bureau of claim 28, wherein the downloading means includes means for downloading the new special rates to the user's local equipment.

30. The long distance service bureau of claim 27, wherein the service logic element further comprises
means for generating a mini-rate table, the mini-rate table including rate data for a user's routinely called zones and subscriber preference data corresponding to the user.

31. The long distance service bureau of claim 30, wherein the service logic element further comprises
means for initially downloading the mini-rate table to the user's local equipment.

32. The long distance service bureau of claim 27, wherein the downloading means includes
means for downloading the rate data changes during idle periods of the user's local equipment.

33. A method for assisting a user in selecting a long distance carrier for a tariff call, comprising the steps of:
receiving subscriber preference data representing the user's preferences for certain ones of various long distance carriers;
periodically communicating with the various long distance carriers to retrieve rate data representing tolls charged by the various long distance carriers;
generating carrier information including the subscriber preference data and the rate data;
downloading the carrier information to local equipment of the user; and
periodically updating the carrier information with current rate data.

34. The method of claim 33, wherein the periodically communicating step includes the substep of
periodically communicating with the various long distance carriers to retrieve special rate data representing special rates offered by the various long distance carriers; and
wherein the generating step includes the substep of
generating carrier information including the subscriber preference data, the rate data, and the special rate data.

35. The method of claim 33, wherein the downloading step includes the substep of
downloading the carrier information during idle periods of the user's local equipment.

36. The method of claim 33, wherein the periodically updating step includes the substep of
downloading the current rate data to the user's local equipment.

37. The method of claim 36, wherein the downloading the current rate data substep includes the substep of
downloading the current rate data during idle periods of the user's local equipment.

38. A network for routing a tariff telephone call, comprising:
a user telephone;
a switch, connected to the user telephone, for routing telephone calls;
a plurality of long distance carrier systems; and
a long distance service bureau, connected to the user telephone via the switch and to the plurality of long distance carrier systems, comprising
means for storing subscriber preference data corresponding to the user telephone and representing preferred long distance carriers for certain situations and dialed telephone numbers,
means for periodically communicating with the long distance carrier systems to retrieve changes to their offered rates, and
means for downloading only the rate changes applicable to the user telephone based on the subscriber preference data during idle periods of the user telephone.

39. The network of claim 38, wherein the periodically communicating means comprises
means for periodically communicating with the long distance carrier systems to retrieve new special rates offered by the long distance carrier systems; and
wherein the downloading means comprises
means for downloading the new special rates to the user telephone during idle periods of the user telephone.

40. A method for facilitating selection of a long distance carrier for a tariff call, comprising the steps, executed by a network server, of:
receiving a telephone call from a user requesting long distance carrier rates for a tariff call;
retrieving user profile data corresponding to the user, the user profile data indicating long distance carrier preferences of the user;
generating carrier information based on current carrier rates offered by various long distance carriers and the user profile data;
downloading the carrier information to local equipment of the user to facilitate selection of a long distance carrier.

41. The method of claim 40, further comprising the step of querying the user for a user identification number; and
wherein the retrieving step comprises the substep of
retrieving the user profile data using the user's identification number.

42. The method of claim 40, further comprising the step of detecting a user identification number from signals in the user's telephone call; and
wherein the retrieving step comprises the substep of
retrieving the user profile data using the user's identification number.

43. The method of claim 40, further comprising the step of querying the user for a telephone number corresponding to the tariff call; and
wherein the generating step comprises the substeps of
determining a zone for which the tariff call is directed, and
generating carrier information based on current carrier rates offered by long distance carriers servicing the determined zone, and the user profile data.

44. The method of claim 40, wherein the generating step comprises the substeps of
periodically and routinely communicating with the various long distance carriers to obtain the current carrier rates, and
using the current carrier rates in generating the carrier information.

45. A long distance service bureau, comprising:
a rate table memory for storing rate data representing tolls charged by various long distance carriers;
a subscriber profile memory for storing subscriber preference data representing preferred long distance carriers for certain situations and dialed telephone numbers, the subscriber preference data being designated by a subscriber of the long distance service bureau; and
a service logic element for controlling the rate table memory and the subscriber profile memory, the service logic element comprising
means for periodically communicating with the various long distance carriers to retrieve current rate data, means for storing the current rate data in the rate table memory, means for receiving a telephone call from the subscriber requesting long distance carrier rates for a tariff call, means for generating a list of long distance carriers from the rate data and the subscriber preference data, and means for communicating the generated list to local equipment of the subscriber.

46. The long distance service bureau of claim 45, wherein the rate table memory further stores special plan data representing special rates and savings plans offered by the various long distance carriers;

wherein the periodically communicating means includes
means for periodically communicating with the various long distance carrier to retrieve new special rates and savings plans;

wherein the storing means includes
means for storing the new special rates and savings plans in the rate table memory; and wherein the generating means includes
means for generating the list of long distance carriers from the rate data, the special plan data, and the subscriber preference data.

47. The long distance service bureau of claim 45, wherein the service logic element further comprises means for querying the subscriber for a subscriber identification number; and wherein the generating means includes
means for retrieving subscriber preference data from the subscriber profile memory using the subscriber identification number.

48. The long distance service bureau of claim 45, wherein the service logic element further comprises means for detecting a subscriber identification number from signals in the subscriber's telephone call; and wherein the generating means includes
means for retrieving subscriber preference data from the subscriber profile memory using the subscriber identification number.

49. The long distance service bureau of claim 45, wherein the service logic element further comprises means for querying the subscriber for a telephone number corresponding to the tariff call; and wherein the generating means includes
means for determining a zone for which the tariff call is directed, and
means for including only long distance carriers servicing the determined zone in the list of long distance carriers.

50. A network for routing a tariff call, comprising:

a user telephone;

a telecommunications system, connected to the user telephone, for routing telephone calls from a user of the user telephone;

a plurality of long distance carrier systems; and a long distance service bureau, connected to the user telephone and the plurality of long distance carrier systems via the telecommunications system, comprising means for periodically communicating with the long distance carrier systems to retrieve current offered rates, means for storing subscriber preference data representing preferred long distance carriers for certain situations and dialed telephone numbers, means for receiving a telephone call from the user requesting long distance carrier rates for a tariff call, means for generating a list of long distance carriers from the current offered rates and the subscriber preference data, and means for communicating the generated list to the user telephone.

51. The network of claim 50, wherein the periodically communicating means includes means for periodically communicating with the long distance carrier systems to retrieve new special rates and savings plans; and wherein the generating means includes
means for generating the list of long distance carriers from the current offered rates, the new special rates and savings plans, and the subscriber preference data.

52. The network of claim 50, wherein the long distance service bureau further comprises means for querying the user for a user identification number; and wherein the generating means includes
means for retrieving subscriber preference data from the storing means using the user identification number.

53. The network of claim 50, wherein the long distance service bureau further comprises means for detecting a user identification number from signals in the user's telephone call; and wherein the generating means includes
means for retrieving subscriber preference data from the storing means using the user identification number.

54. The network of claim 50, wherein the long distance service bureau further comprises means for querying the user for a telephone number corresponding to the tariff call; and wherein the generating means includes
means for determining a zone for which the tariff call is directed, and
means for including only long distance carriers servicing the determined zone in the list of long distance carriers.

* * * * *

UNITED STATES PATENT AND TRADEMARK OFFICE
CERTIFICATE OF CORRECTION

PATENT NO.: 5,878,122

DATED: March 2, 1999

INVENTOR(S): Lester Lynn White et al.

It is certified that an error appears in the above-identified patent and that said Letters Patent is hereby corrected as shown below:

Claim 5, col. 8, line 11, delete "(Amended)".

Claim 46, col. 13, line 17, change "carrier" to --carriers--.

Signed and Sealed this

Twentieth Day of July, 1999

*Attest:*

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO.: 5,878,122

DATED: March 2, 1999

INVENTOR(S): Lester Lynn White et al.

It is certified that an error appears in the above-identified patent and that said Letters Patent is hereby corrected as shown below:

Claim 5, col. 8, line 11, delete "(Amended)".

Signed and Sealed this

Tenth Day of August, 1999

*Attest:*

Q. TODD DICKINSON

*Attesting Officer*     *Acting Commissioner of Patents and Trademarks*